US012652116B2

(12) United States Patent
Wong et al.

(10) Patent No.: US 12,652,116 B2
(45) Date of Patent: Jun. 9, 2026

(54) SYSTEM AND METHOD FOR RF ANOMALY OR INTERFERENCE DETECTION

(71) Applicant: Rohde & Schwarz GmbH & Co. KG, Munich (DE)

(72) Inventors: Kok Meng Wong, Singapore (SG); Rajashekar Durai, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 540 days.

(21) Appl. No.: 18/176,689

(22) Filed: Mar. 1, 2023

(65) Prior Publication Data

US 2023/0336259 A1 Oct. 19, 2023

(30) Foreign Application Priority Data

Apr. 14, 2022 (EP) ..................................... 22168333

(51) Int. Cl.
*H04B 17/345* (2015.01)
*G05B 13/02* (2006.01)
(Continued)

(52) U.S. Cl.
CPC ......... *H04B 17/345* (2015.01); *G05B 13/027* (2013.01); *H04B 17/27* (2015.01); *H04W 24/06* (2013.01)

(58) Field of Classification Search
CPC .... H04B 17/345; H04B 17/27; G05B 13/027; H04W 24/06; G06N 3/0464; G06N 3/0475; G06N 3/088; G06N 3/09; G06N 3/094
See application file for complete search history.

(56) References Cited

U.S. PATENT DOCUMENTS 5,510,943 A 4/1996 Fukunaga
10,129,768 B1 * 11/2018 Azem .................. H04B 17/318
(Continued)

FOREIGN PATENT DOCUMENTS

CN 108960303 A 12/2018
CN 110750786 A 2/2020
(Continued)

OTHER PUBLICATIONS

Extended European Search Report issued in EP 22168333.7-1206 by the European Patent Office on Sep. 28, 2022.

*Primary Examiner* — Tejis Daya
(74) *Attorney, Agent, or Firm* — Studebaker Brackett PLLC

(57) ABSTRACT

The invention relates to system (10) for radio frequency, RF, anomaly or interference detection in an environment (20). The system (10) comprises an unmanned vehicle (11) which is configured to move through the environment (20), and at least one RF receiver (12) which is mounted to the unmanned vehicle (11) and which is configured to record RF spectral data at different locations in the environment (20). The system (10) further comprises at least one RF machine learning unit, RFMLU (13), wherein the RFMLU (13) is configured to analyze the RF spectral data in order to detect RF anomalies or interferences. In case of detecting an RF anomaly or interference with the RFMLU (13), the RF receiver (12) is configured to record a baseband signal of an RF environment at the location of the detected RF anomaly or interference.

14 Claims, 3 Drawing Sheets

(51) Int. Cl.
   *H04B 17/27*  (2015.01)
   *H04W 24/06*  (2009.01)

(56) References Cited

U.S. PATENT DOCUMENTS

| | | | |
|---|---|---|---|
| 10,692,364 B1 | 6/2020 | Rao | |
| 11,630,996 B1 * | 4/2023 | O'Shea | G06N 3/0455 |
| | | | 706/25 |
| 2018/0262525 A1 | 9/2018 | Yan et al. | |
| 2019/0188797 A1 | 6/2019 | Przechocki et al. | |
| 2019/0303648 A1 | 10/2019 | Zhai et al. | |
| 2019/0304316 A1 * | 10/2019 | Bohanan | G08G 5/55 |
| 2020/0083918 A1 * | 3/2020 | Miyake | H04B 17/345 |
| 2020/0401157 A1 * | 12/2020 | Johnston | G05D 1/0285 |
| 2021/0211911 A1 * | 7/2021 | Kleinbeck | H04W 24/10 |
| 2021/0342713 A1 | 11/2021 | D'Elia et al. | |
| 2021/0369393 A1 | 12/2021 | Braido et al. | |
| 2021/0397888 A1 | 12/2021 | Kuramoto et al. | |
| 2022/0005332 A1 | 1/2022 | Metzler et al. | |

| | | | | |
|---|---|---|---|---|
| 2023/0322381 A1 * | 10/2023 | Flick | G06V 20/17 | |
| | | | 701/3 | |
| 2023/0326188 A1 * | 10/2023 | Haochen | G06V 10/764 | |
| | | | 382/157 | |

FOREIGN PATENT DOCUMENTS

| | | | |
|---|---|---|---|
| CN | 112700613 A | 4/2021 | |
| CN | 113177571 A | 7/2021 | |
| CN | 113313703 A | 8/2021 | |
| CN | 113469217 A | 10/2021 | |
| CN | 112924749 B | 12/2021 | |
| DE | 102017102679 A1 | 8/2018 | |
| EP | 3571862 A1 | 11/2019 | |
| KR | 10-2019-0098092 A | 8/2019 | |
| WO | 2018/060967 A1 | 4/2018 | |
| WO | 2018/136785 A1 | 7/2018 | |
| WO | 2018/136785 A9 | 7/2018 | |
| WO | 2021/040795 A1 | 3/2021 | |
| WO | 2021/048848 A2 | 3/2021 | |
| WO | 2021/207557 A1 | 10/2021 | |
| WO | 2021/239716 A1 | 12/2021 | |

* cited by examiner

30

31 Moving through an environment

32 Recording RF spectral data

33 Analyzing the spectral data to detect RF anomalies or interferences

34 Recording a baseband signal

SYSTEM AND METHOD FOR RF ANOMALY OR INTERFERENCE DETECTION

TECHNICAL FIELD OF THE INVENTION

The invention relates to a system and a method for detecting radio frequency (RF) anomalies or interferences in an environment, such as a building.

BACKGROUND OF THE INVENTION

Entities in smart buildings or factories communicate with each other over wireless networks, such as WiFi or private LTE/5G networks. Anomalies or unexpected signals in the RF environment can potentially interfere with these wireless communications or even cause a network to breakdown. This can be a serious problem especially in the case of a smart factory where a communication breakdown may lead to production downtime.

When an anomaly or an unexpected signal is interfering with a wireless network and thereby causing noticeable disturbances, the current approach is to send an engineer to the site who then searches for the interference source using, for instance, a mobile RF receiving device. However, this method is rather reactive, i.e., it reacts to a problem that has occurred.

Thus, it is an objective to provide an improved system and method for proactively detecting RF anomalies and interferences in an environment such as a building.

SUMMARY OF THE INVENTION

The object of the present invention is achieved by the solution provided in the enclosed independent claims. Advantageous implementations of the present invention are further defined in the dependent claims.

According to a first aspect, the invention relates to a system for radio frequency, RF, anomaly or interference detection in an environment, comprising: an unmanned vehicle which is configured to move through the environment; at least one RF receiver which is mounted to the unmanned vehicle and which is configured to record RF spectral data at different locations in the environment; at least one RF machine learning unit, RFMLU, wherein the RFMLU is configured to analyze the RF spectral data in order to detect RF anomalies or interferences; wherein, in case of detecting an RF anomaly or interference with the RFMLU, the RF receiver is configured to record a baseband signal of an RF environment at the location of the detected RF anomaly or interference.

This achieves the advantage that RF anomalies or interferences can be detected quickly and autonomously, e.g. before the anomaly or interference causes noticeable distur- bances such as network downtimes. In particular, it is no longer required to have an engineer on site for "interference" hunting.

RF anomalies and/or interferences are, for instance, caused by interference signals which negatively interfere with a wireless network in the environment. The interference signals can be emitted by external or unwanted radio trans- mitters in the environment. Thereby, the position of the interferer that transmits the interference signal is important for rectifying the problem.

The environment can be a building, in particular a smart building, or a factory.

The location of the detected RF anomaly or interference can refer to the location of the unmanned vehicle when receiving the RF spectral data in which the anomaly or interference was detected.

The RF spectral data can comprise a recorded RF spec- trum within a certain frequency range, i.e. a spectrum of RF signals within the frequency range. The RFMLU can be trained to detect fingerprints in the recorded RF spectrum that indicate the presence of an anomaly or interference. The RFMLU can then trigger the RF receiver to record at least one RF signal at the location of the detected anomaly or interference and to demodulate said RF signal to the base- band signal. Thus, the baseband signal of the RF environ- ment may refer to at least one demodulated RF signal that is present in the environment.

Recording the baseband signal allows for a detailed analysis of the RF environment. However, RF baseband signal files are typically very large and are therefore only recorded when an anomaly or interference is detected. In contrast, the RF spectral data preferably only contains the frequency spectrum of RF signals in the environment. Thus, RF spectral data files are typically much smaller in size than RF baseband signal files and can be recorded and/or ana- lyzed more quickly.

In an embodiment, the RF receiver is configured to record the baseband signal in an I/Q data format.

In an embodiment, the RF receiver is configured to continuously or periodically record the RF spectral data. This achieves the advantage that the environment can be scanned systematically for anomalies or interferences.

In particular, the RF spectral data is continuously or periodically recorded while the unmanned vehicle is moving through the environment.

In an embodiment, the unmanned vehicle is an unmanned ground vehicle or a drone.

In an embodiment, the unmanned vehicle is configured to receive location data indicating its current location in the environment. This achieves the advantage that the location in the environment at which an RF anomaly or interference occurs can be recorded.

The unmanned vehicle may comprise one or more sensors for receiving the location data. For instance, the unmanned vehicle can have a GPS and/or GNSS sensor and the location data can be GPS and/or GNSS data, respectively. Addition- ally or alternatively, the unmanned vehicle can have further sensors, such as radar sensors or cameras, to receive the location data. The location data can be any data that indi- cates a location of the unmanned vehicle in or relative to the environment.

Preferably, in case of detecting the RF anomaly or inter- ference in the RF spectral data, the unmanned vehicle is configured to record the location at which the RF spectral data with the RF anomaly or interference was recorded. This achieves the advantage that the exact location of the RF anomaly or interference in the environment is known such that the problem causing the anomaly or interference can be quickly resolved.

In an embodiment, the unmanned vehicle is further con- figured to forward the baseband data together with the recorded location to a database of the system. This achieves the advantage that the baseband data can be analyzed precisely while the system continues to scan for anomalies and interferences.

The unmanned vehicle may comprise a preferably wire- less communication interface for forwarding the baseband data and the recorded location data to the database.

In particular, upon detecting an anomaly or interference with the RFMLU, the RFMLU can control the RF receiver to record the baseband signal and the unmanned vehicle to record the location at which the anomaly or interference was detected. The RFMLU can further control the unmanned vehicle to forward the baseband data and the recorded location data to the database via the communication interface.

In an embodiment, the unmanned vehicle also carries the RFMLU.

In particular, the RFMLU can be deployed inside the RF receiver, i.e. it can be a component of the RF receiver. The RFMLU can be implemented via hardware and/or software.

In an embodiment, the unmanned vehicle is configured to move through the environment along a preset, a learned or a random path.

In an embodiment, the system is operable in a learning mode in which the RF receiver is configured to record spectral training data, and in which the RFMLU is trained based on said spectral training data using a supervised and/or an unsupervised learning technique.

Spectral training data can be similar to RF spectral data and can comprise a recorded RF spectrum within a certain frequency range.

Alternatively or additionally, in the learning mode, the RFMLU can be fed with already pre-recorded or with synthetic spectral training data. For instance, this pre-recorded or synthetic spectral training data may comprise anomalies and/or interferences.

The RFMLU may comprise at least one trainable neural network. The at least one trainable neural network can form a generative adversarial network (GAN) or a convolutional neural network (CNN).

Preferably, in the learning mode, the unmanned vehicle is configured to move through the environment and thereby to generate or update a map of the environment. In particular, the unmanned vehicle can generate or update the map based on location data received by one or more sensors of the vehicle while moving through the environment. The map can be stored in a memory of the unmanned vehicle.

In an embodiment, the system is operable in an operating mode in which the RF receiver is configured to record the RF spectral data, and in which the RFMLU is configured to detect the RF anomalies or interferences in the RF spectral data based on its previous training.

According to a second aspect, the invention relates to a method for radio frequency, RF, anomaly or interference detection in an environment, comprising the steps of:

moving at least one RF receiver through the environment using an unmanned vehicle;

recording RF spectral data with the RF receiver at different locations in the environment;

analyzing the recorded RF spectral data using a machine learning technique in order to detect RF anomalies or interferences; and, in case of detecting an RF anomaly or interference, recording a baseband signal of an RF environment at the location of the detected RF anomaly or interference.

In particular, an RF machine learning unit, RFMLU, is used to analyzing the recorded RF spectral data and to detect the RF anomalies or interferences based on said analysis.

In an embodiment, the baseband data is recorded in an I/Q data format.

In an embodiment, the method comprises the further step of: receiving location data indicating a current location of the unmanned vehicle in the environment.

The above description with regard to the system according to the first aspect of the invention is correspondingly valid for the method according to the second aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
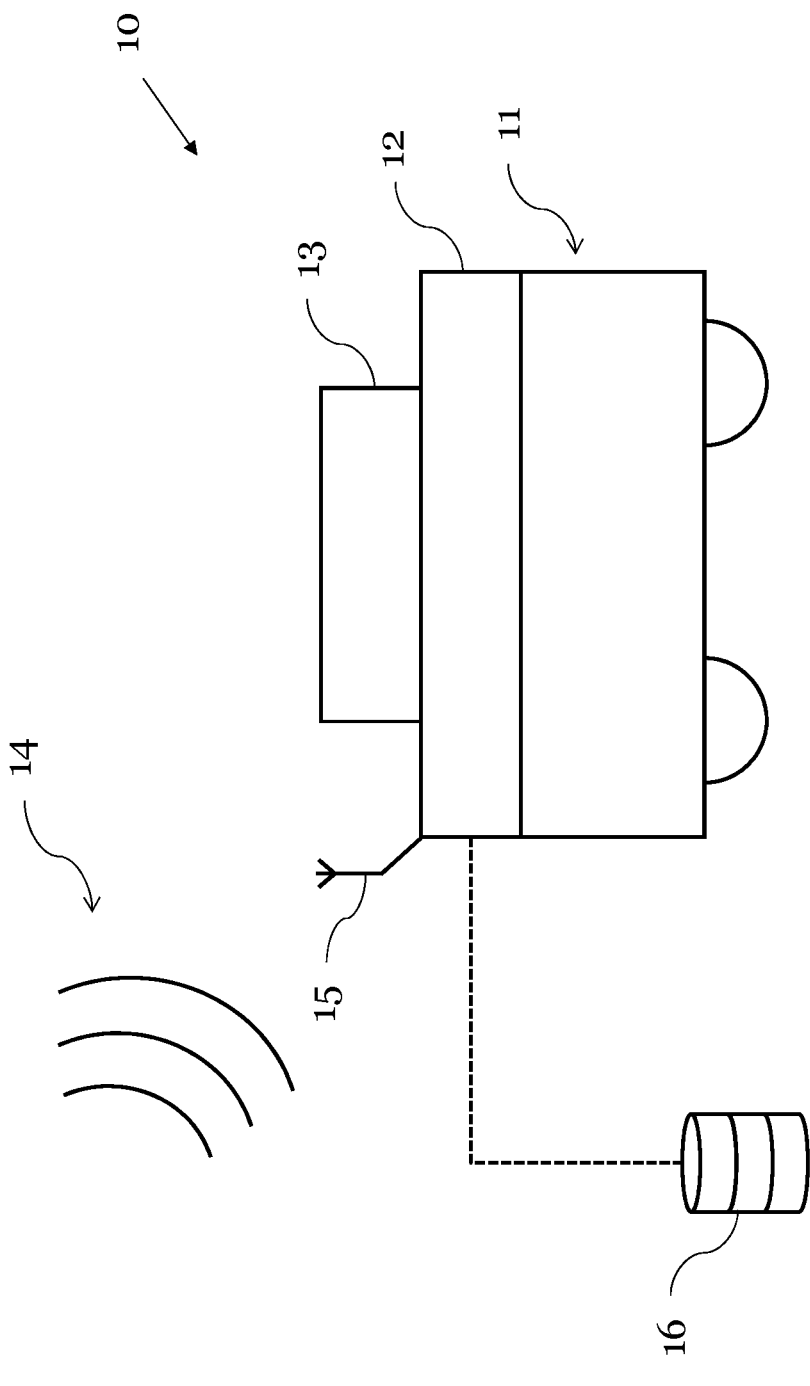
FIG. 1 shows a schematic diagram of a system for RF anomaly or interference detection according to an embodiment.

FIG. 1 shows a system 10 for RF anomaly or interference detection in an environment according to an embodiment.

The system 10 comprises an unmanned vehicle 11 which is configured to move through the environment and at least one RF receiver 12 which is mounted to the unmanned vehicle 11 and which is configured to record RF spectral data at different locations in the environment. The system 10 further comprises at least one RF machine learning unit (RFMLU) 13, wherein the RFMLU 13 is configured to analyze the RF spectral data in order to detect RF anomalies or interferences, wherein, in case of detecting an RF anomaly or interference with the RFMLU 13, the RF receiver 12 is configured to record a baseband signal of an RF environment at the location of the detected RF anomaly or interference.

The RF receiver 12 can comprise an antenna 15, in particular a directional antenna, for recording the RF spectral data and/or the baseband signal.

The RF receiver 12 can be configured to scan an RF spectrum in the environment and record the RF spectral data. The RF spectral data can be RF trace data. For instance, RF trace data files contain only a frequency spectrum of RF signals 14 recorded by the RF receiver 12.

When an anomaly or an interference is detected, the RF receiver 12 can be configured to record a baseband signal. The baseband signal can be a signal of the RF environment at the location of the RF anomaly or interference. The RF environment may refer to the detectable RF signal(s) in the environment. The baseband signal can be a snapshot of the RF environment, e.g., in an I/Q data format. RF I/Q data allows a detailed analysis of RF signals 14 at the location of the detected anomaly or interference. However, RF I/Q data files are typically very large and therefore only recorded when an anomaly or interference is detected.

The RFMLU 13 can be configured to detect the RF anomalies or interferences based on the analysis of the RF spectral data. The analysis can comprise applying a trained algorithm to the RF spectral data, wherein the algorithm is trained to detect traces or fingerprints of anomalies or interference in the RF spectral data. Since the RF spectral data files are much smaller in size than the baseband signal files they are easier to train with. When an anomaly or interference is detected, the RFMLU 13 immediately informs the RF receiver 12 to download the snapshot of the RF environment (baseband signal, e.g., in I/Q data format) for further analysis.

The RFMLU 13 can be implemented as software and/or hardware. For instance, the RFMLU 13 is deployed inside the RF receiver 12 itself.

The unmanned vehicle 11 can be a ground vehicle as shown in FIG. 1. Alternatively, the unmanned vehicle 11 can also be an aerial vehicle, such as a drone, or any other autonomous platform capable of carrying the RF receiver 12 through the environment.

The unmanned vehicle 11 carries the RF receiver 12 and moves around the environment, e.g. a building, to ensure that the RF receiver 12 can scan the RF spectrum at different locations in the environment.

Preferably, the unmanned vehicle 11 is configured to receive location data indicating its current location in the environment. For example, the unmanned vehicle has one or more sensors to receive the location data. The sensors can comprise a GPS and/or GNSS sensor, a radar sensors and/or a camera. The location data can be any data that indicates the location of the unmanned vehicle in the environment, e.g. GPS or GNSS position data.

Preferably, in case of detecting the RF anomaly or interference in the RF spectral data, the unmanned vehicle is configured to record the location at which the RF spectral data with the RF anomaly or interference was recorded. The location can be recorded in the form of the location data received by the unmanned vehicle (e.g., GPS or GNSS position data). For instance, for each recording of RF spectral data with the RF receiver 12, the unmanned vehicle 11 can record the corresponding location data that indicates the location at which the RF spectral data was recorded. The unmanned vehicle 11 can comprise a memory for at least temporarily saving the RF spectral data and/or the corresponding location data.

When an anomaly or interference is detected in the RF spectral data, the unmanned vehicle 11 can be configured to record the baseband signal and to save the corresponding baseband data (i.e., the recorded baseband signal) and the location information together in a database 16 of the system 10. For instance, if the environment is a building and GPS or GNSS data is available inside the building, GNSS or GPS data can be saved together with the baseband signal in the database 16.

The unmanned vehicle 11 may comprise a preferably wireless communication interface for forwarding the baseband data and recorded location data to the database 16. The database 16 can comprise a permanent data storage. The database 16 can be remote to the unmanned vehicle as shown in FIG. 1.

Figure 2:
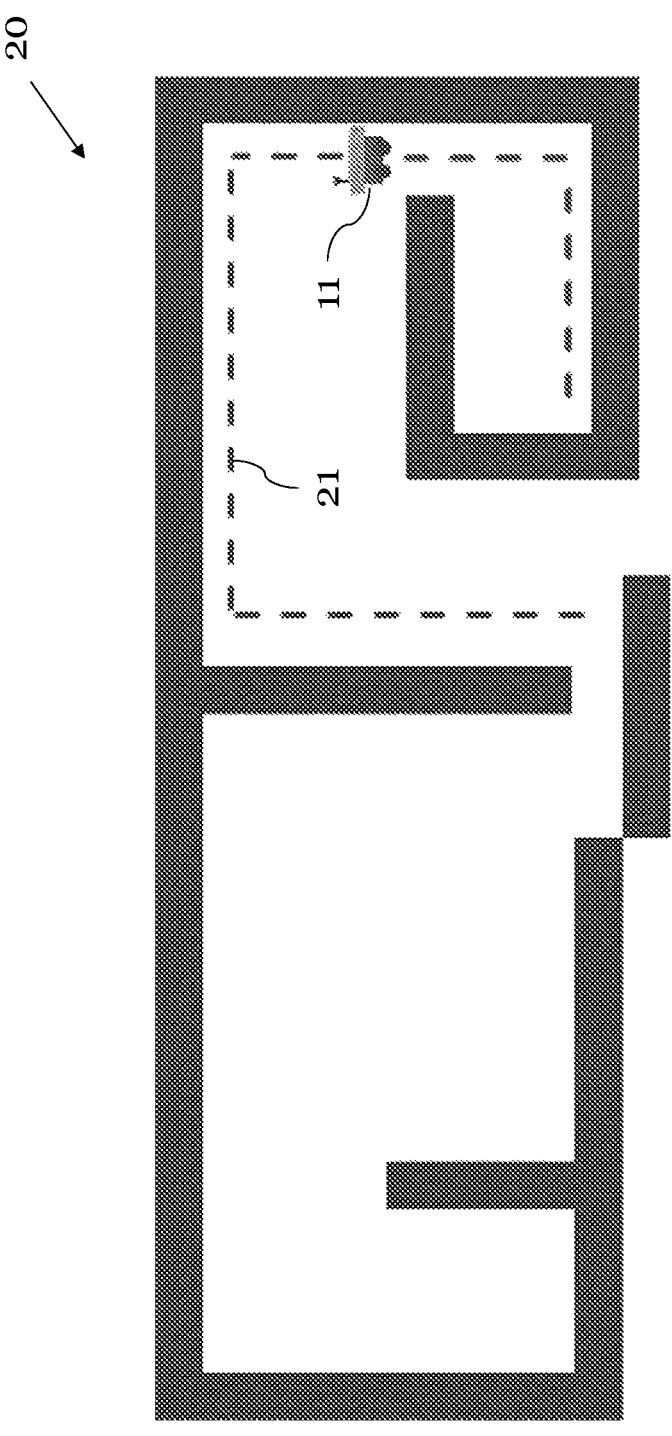
FIG. 2 shows a schematic diagram of an unmanned vehicle moving through an environment according to an embodiment.

FIG. 2 shows a schematic diagram of the unmanned vehicle 11 moving through an environment 20.

The environment 20 can be a building, e.g. a smart building, or a factory.

The unmanned vehicle 11 can be configured to move through the environment 20 along a preset, a learned or a random path 21.

While the unmanned vehicle 11 is moving, the receiver 12 can record the RF spectral data continuously or periodically in discrete time increments. For instance, the unmanned vehicle 11 can be configured to stop each time the RF receiver 12 records an RF spectral data and/or a baseband signal.

The system 10 can be operable in two modes (or phases): A learning mode and an operating mode.

In the learning mode (or phase), the vehicle 11 can be deployed on-site and move through the environment 20, e.g. for a few rounds, to train the system 10. For instance, in the learning mode, the RF receiver 12 records spectral training data which can be used to train the RFMLU 13 by supervised or unsupervised learning techniques. The RFMLU 13 may comprise at least one trainable neural network. The at least one trainable neural network can form a generative adversarial network (GAN) or a convolutional neural network (CNN).

In the learning mode, the unmanned vehicle 11 can further be configured to map the environment 20 based on received position data, e.g. GPS or GNSS data or radar data, while moving through the environment. In particular, the unmanned vehicle 11 can generate or update a map of the environment 20 in the training mode. The map can be a floor plan of a building or factory. The map can be stored in a memory of the vehicle 11.

In the operating mode (or operating phase), the unmanned vehicle 11 can be deployed on-site to search for RF anomalies or interferences based on its previous training. Thereby, the RF receiver records RF spectral data while the unmanned vehicle 11 moves through the environment 20 and records location data (see above). The RFMLU 13 can analyze the RF spectral data and trigger a recording and an analysis of baseband signals if an anomaly or interference is detected. In particular, the analysis of the RF spectral data and the detection of anomalies or interferences can be performed by using methods known in the art like comparing a RF baseline to a current RF signal recorded by the RF receiver 12.

In this way, detailed location information of a position of an interferer can be provided via the position of the unmanned vehicle 11, whereas the nature of an interfering signal (e.g. WiFi, GSM, Bluetooth . . . ) and/or an RF baseline can be detected by the RF receiver 12 and the RFMLU 13. Thereby, the RF spectral data can be used to trigger a recording of baseband signals for a further analysis.

The RF receiver 12 can further be configured to record additional spectral training data while the system 10 is in the operating mode, and feed the additional spectral training data to the RFMLU 13 for continuous training.

Figure 3:
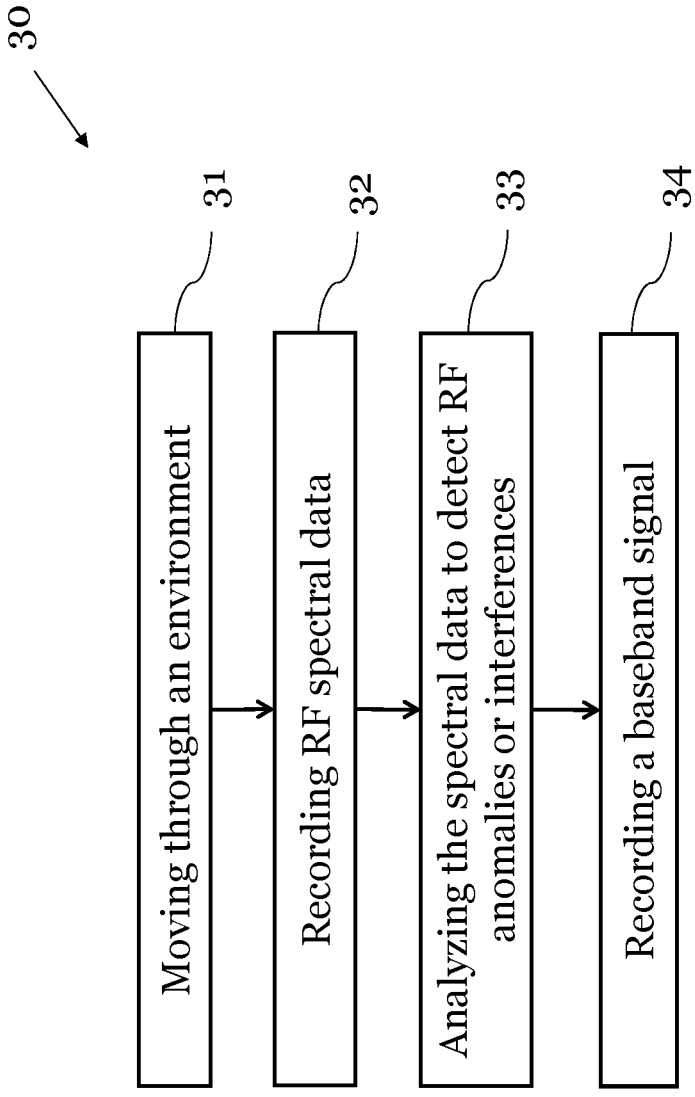
FIG. 3 shows a flow diagram of a method for RF anomaly or interference detection according to an embodiment.

FIG. 3 shows a flow diagram of a method 30 for RF anomaly or interference detection in an environment 20 according to an embodiment.

The method 30 comprises the steps of:

moving 31 at least one RF receiver 12 through the environment 20 using an unmanned vehicle 11;

recording 32 RF spectral data with the RF receiver 12 at different locations in the environment 20;

analyzing 33 the recorded RF spectral data using a machine learning technique in order to detect RF anomalies or interferences; and in case of detecting an RF anomaly or interference, recording 34 a baseband signal of an RF environment at the location of the detected RF anomaly or interference.

Thereby, the baseband data can be recorded in the form of I/Q data.

The RF receiver 12 can record the RF spectral data continuously or periodically, i.e. in discrete time intervals.

The method 30 may comprise the further step of:

receiving location data indicating a current location of the unmanned vehicle 11 in the environment 20.

For instance, the location data can be received respectively recorded for each recording 32 of the RF spectral data.

The method 30 provides a proactive way of handling an anomaly or an interference by an unexpected signal in a wireless network. It allows to detect the RF anomaly or interference early such that a problem, like production downtime, can be minimized or completely prevented.

The method 30 can be carried out by the system 10 shown in FIG. 1.

All features described above or features shown in the figures can be combined with each other in any advantageous manner within the scope of the invention.

The invention claimed is:

1. A system for radio frequency, RF, anomaly or interference detection in an environment, comprising:

an unmanned vehicle which is configured to move through the environment;

at least one RF receiver which is mounted to the unmanned vehicle and which is configured to record RF spectral data at different locations in the environment;

at least one RF machine learning unit, RFMLU, wherein the RFMLU is configured to analyze the RF spectral data in order to detect RF anomalies or interferences;

wherein, in case of detecting an RF anomaly or interference with the RFMLU, the RF receiver is configured to record a baseband signal of an RF environment at the location of the detected RF anomaly or interference, and wherein the system is operable in a learning mode in which the RF receiver is configured to record spectral training data, and in which the RFMLU is trained based on said spectral training data using a supervised and/or an unsupervised learning technique.

2. The system of claim 1, wherein the RF receiver is configured to record the baseband signal in an I/Q data format.

3. The system of claim 1, wherein the RF receiver is configured to continuously or periodically record the RF spectral data.

4. The system of claim 1, wherein the unmanned vehicle is an unmanned ground vehicle or a drone.

5. The system of claim 1, wherein the unmanned vehicle is configured to receive location data indicating its current location in the environment.

6. The system of claim 5, wherein, in case of detecting the RF anomaly or interference in the RF spectral data, the unmanned vehicle is configured to record the location at which the RF spectral data with the RF anomaly or interference was recorded.

7. The system of claim 6, wherein the unmanned vehicle is further configured to forward the baseband data together with the recorded location to a database of the system.

8. The system of claim 1, wherein the unmanned vehicle also carries the RFMLU.

9. The system of claim 1, wherein the unmanned vehicle is configured to move through the environment along a preset, a learned or a random path.

10. The system of claim 1, wherein, in the learning mode, the unmanned vehicle is configured to move through the environment and thereby to generate or update a map of the environment.

11. The system of claim 1, wherein the system is operable in an operating mode in which the RF receiver is configured to record the RF spectral data, and in which the RFMLU is configured to detect the RF anomalies or interferences in the RF spectral data based on its previous training.

12. A method for radio frequency, RF, anomaly or interference detection in an environment, comprising the steps of:

moving at least one RF receiver through the environment using an unmanned vehicle;

recording RF spectral data with the RF receiver at different locations in the environment;

analyzing the recorded RF spectral data using a machine learning technique in order to detect RF anomalies or interferences;

in case of detecting an RF anomaly or interference, recording a baseband signal of an RF environment at the location of the detected RF anomaly or interference; and recording spectral training data with the RF receiver, and training at least one RF machine learning unit, RFMLU, based on said spectral training data using a supervised and/or an unsupervised learning technique.

13. The method of claim 12, wherein the baseband data is recorded in an I/Q data format.

14. The method of claim 12, wherein the method comprises the further step of:

receiving location data indicating a current location of the unmanned vehicle in the environment.

* * * * *